US009544419B2

(12) United States Patent
Kozaczuk et al.

(10) Patent No.: US 9,544,419 B2
(45) Date of Patent: Jan. 10, 2017

(54) METHODS AND SYSTEMS FOR CONFIGURING A MOBILE DEVICE BASED ON AN ORIENTATION-BASED USAGE CONTEXT

(71) Applicant: Intel Corporation, Santa Clara, CA (US)

(72) Inventors: Anthony Kozaczuk, Burlingame, CA (US); Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,436

(22) Filed: Dec. 24, 2014

(65) Prior Publication Data
US 2016/0191696 A1   Jun. 30, 2016

(51) Int. Cl.
| | | |
|---|---|---|
| *H04M 1/725* | (2006.01) | |
| *G06F 3/041* | (2006.01) | |
| *H04W 4/00* | (2009.01) | |
| *H04W 52/02* | (2009.01) | |

(52) U.S. Cl.
CPC .......... *H04M 1/72569* (2013.01); *G06F 3/041* (2013.01); *H04W 4/005* (2013.01); *H04W 52/0209* (2013.01)

(58) Field of Classification Search
CPC .... H04W 68/005; H04W 68/02; H04W 4/005; H04W 52/0209; H04M 1/72569; G06F 3/041
USPC ................... 455/403, 405, 550.1, 566, 158.4
See application file for complete search history.

(56) References Cited

U.S. PATENT DOCUMENTS

| | | | |
|---|---|---|---|
| 7,080,271 B2 | 7/2006 | Kardach et al. | |
| 7,428,650 B2 | 9/2008 | Kardach et al. | |
| 7,660,914 B2 | 2/2010 | Perez et al. | |
| 8,892,403 B1 | 11/2014 | Le Grand et al. | |
| 2008/0070648 A1* | 3/2008 | Kang | H04M 1/0214 455/575.3 |
| 2008/0247128 A1 | 10/2008 | Khoo | |
| 2010/0033916 A1 | 2/2010 | Douglas et al. | |
| 2010/0201878 A1 | 8/2010 | Barenbrug et al. | |
| 2010/0321275 A1 | 12/2010 | Hinckley et al. | |

(Continued)

FOREIGN PATENT DOCUMENTS

| | | |
|---|---|---|
| CN | ZL 200810091923.7 | 11/2011 |
| WO | 2013059246 | 4/2013 |

OTHER PUBLICATIONS

PCT/US2015/060194, International Search Report and Written Opinion, Dated Feb. 22, 2016, 16 pages.

*Primary Examiner* — Cong Tran
(74) *Attorney, Agent, or Firm* — Blakely, Sokoloff, Taylor & Zafman LLP

(57) ABSTRACT

Disclosed is an apparatus and method for automatically configuring a mobile device. A mobile device can include a touch sensitive display, a processor, and a plurality of sensors to collect sensor data associated with the mobile device. The mobile device may establish an orientation of the mobile device relative to a user of the mobile device based on the sensor data. The mobile device may then determine a usage context for the mobile device based at least on the established orientation of the mobile device relative to the user. Furthermore, the mobile device may configure one or more components of the mobile device based on the determined usage context.

23 Claims, 6 Drawing Sheets

(56) References Cited

U.S. PATENT DOCUMENTS

| | | | |
|---|---|---|---|
| 2011/0191478 A1 | 8/2011 | Eischeid et al. | |
| 2012/0252425 A1* | 10/2012 | Moeglein | H04W 84/18 |
| | | | 455/418 |
| 2012/0256929 A1 | 10/2012 | Koenig et al. | |
| 2012/0280917 A1 | 11/2012 | Toksvig et al. | |
| 2013/0332847 A1* | 12/2013 | Choi | H04M 1/72566 |
| | | | 715/745 |
| 2014/0062919 A1* | 3/2014 | Park | G06F 3/0488 |
| | | | 345/173 |
| 2014/0092045 A1 | 4/2014 | Ananthapadmanabh et al. | |
| 2015/0074615 A1* | 3/2015 | Han | G06K 9/00033 |
| | | | 715/863 |
| 2015/0080011 A1* | 3/2015 | Zelinka | H04W 4/02 |
| | | | 455/456.1 |
| 2015/0116364 A1* | 4/2015 | Aurongzeb | G06F 3/0487 |
| | | | 345/659 |
| 2015/0177945 A1* | 6/2015 | Sengupta | G06F 3/0488 |
| | | | 715/744 |
| 2015/0317565 A1* | 11/2015 | Li | G06N 5/048 |
| | | | 706/52 |

\* cited by examiner

METHODS AND SYSTEMS FOR CONFIGURING A MOBILE DEVICE BASED ON AN ORIENTATION-BASED USAGE CONTEXT

TECHNICAL FIELD

Embodiments described herein generally relate to automatically configuring a mobile device for a user.

BACKGROUND

Tablet computers, smartphones, and other mobile devices have touch sensitive displays on which a user can physically interact with a user interface of the device. Such interactions can include launching an application from the user interface by touching an application icon, adjusting settings (e.g., volume, brightness, etc.) of the device by touching the user interface and navigating menus of one or more user interface screens, as well as other interactions enabled by the touch sensitive display. When the display is active, any touch on the device may launch an application, adjust settings, etc., even if the user does not intend to perform the associated action. For example, although a mobile device has been inactive for a period of time, its touch screen may still be active when a user picks up the mobile device. In picking up the device, the user may inadvertently touch an application icon thereby launching the application, inadvertently make a user interface selection, etc. These inadvertent actions can have unintended consequences, such as inadvertently sending a message, inadvertently rearranging application icons in the user interface, deleting content from the mobile device, as well as other unintended actions.

Mobile devices often control the active time of a display, such as a touch sensitive display, by timers. That is, when a display of a mobile device has been inactive for a pre-set amount of time, the display is deactivated. The deactivation serves to save power on the device, and as a result also prevents the inadvertent actions discussed above. A user may also proactively select to deactivate a mobile device's display by pressing a button on the device, selecting a user interface element, or through some other explicit user command. However, prior to the timer elapsing or the user explicitly deactivating the device's display, one or more of the actions discussed above may have been inadvertently triggered.

DESCRIPTION OF EMBODIMENTS

Figure 1:
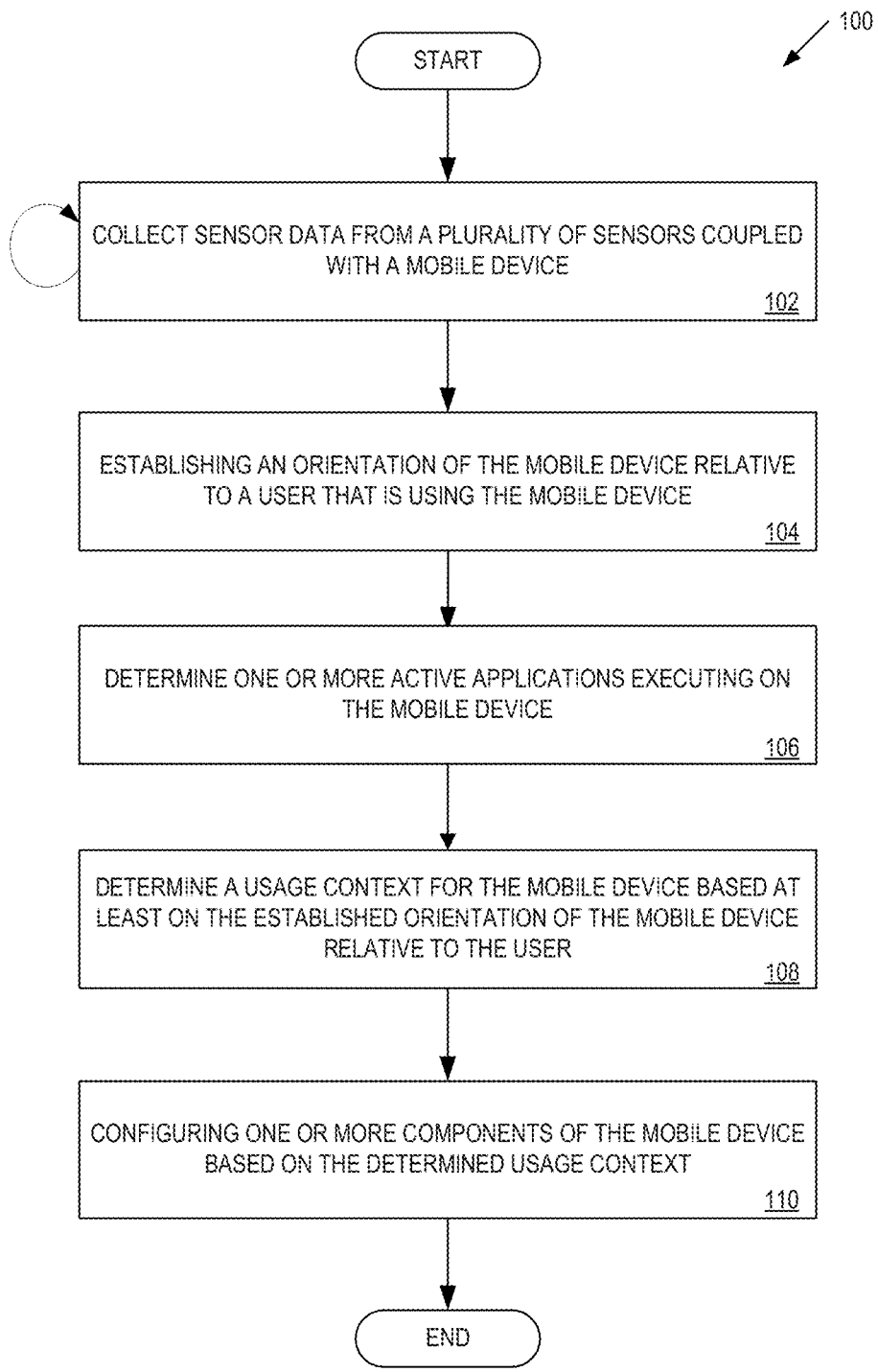
FIG. 1 is a flow diagram of one embodiment of a method for configuring a mobile device for a usage context that is based on an orientation of the mobile device relative to a user.

Methods and systems are disclosed herein for automatically configuring a mobile device for a usage context that is based on an orientation of the mobile device relative to a user. In one embodiment, the mobile device may be a tablet computer, mobile telephone, a smartphone, laptop computer, or any other mobile device with at least one touch sensitive screen. In one embodiment, a touch sensitive screen is a capacitive touch sensitive screen, resistive touch sensitive screen, etc. that enables a user to interact with the mobile device through touch. For ease of discussion, the remaining description will utilize the terms mobile device, tablet, and tablet computer interchangeably, and not by way of limitation.

A mobile device includes one or more sensors that are used by the mobile device to collect sensor data. The sensors may include a combination of one or more accelerometers, gyroscopes, magnetometers, proximity sensors, pressure sensors, light sensors, as well as other sensors. Conventional mobile devices would use the sensor data collected by the sensors to determine the mobile devices spatial orientation, and take actions such as changing an orientation of the display. However, the use of the sensor data by conventional mobile devices provides no indication of an orientation of the mobile device and the orientation's relationship to the user of the mobile device.

In one embodiment, a combination of sensor data from two or more different sensors is utilized to establish an orientation of the mobile device relative to a user. The relative position to the user is based on at least sensor data indicative of a physical orientation of the device and sensor data indicative of a user proximity to a display of the mobile device. As discussed in greater detail below, for example, the orientation relative to the user may indicate that although the mobile device's orientation is facing down, a user is proximate to the mobile devices primary display (e.g., the user is laying down while holding the mobile device). As another example, the orientation of the mobile device may indicate that the device is facing up, but a user is not using or proximate to the mobile device's display (e.g., the user has walked away from the device). In one embodiment, the position of the mobile device and the relationship between the mobile device and a user can be determined based, at least in part, on the collected sensor data.

In one embodiment, the orientation of the mobile device relative to a user enables the mobile device to determine a usage context of the mobile device. In one embodiment, the determined usage context is used by the mobile device to automatically configure one or more components of the mobile device, where the configuration reflects an inferred likely usage of the device by the user. Continuing the example above, where the mobile device's orientation is determined to be facing down and a user is proximate to the mobile device's display, the mobile device can determine a usage context that indicates usage of the display by a user. In such a case, the display maintains an active state to enable the user to continue interacting with the mobile device. Similarly, if the mobile device's orientation is determined to be facing down but the user is not detected to be proximate to the mobile device's display, the mobile device can determine a usage context that indicates non-usage of the display by the user. In this example, the mobile device can automatically configure the primary display by placing the display in a standby mode, sleep mode, or other mode that disables the touch sensitive capabilities of the display, disables the display, and/or places the mobile device in a reduced power state.

In one embodiment, the mobile device may include more than one display on opposite sides of the mobile device. In one embodiment, the mobile device can include two touch sensitive screens on opposite sides of the device, where one acts as a primary display and the other acts as a secondary display. In another embodiment, the mobile device includes a touch sensitive screen that acts as a primary display on one side of the device and secondary screen, such as an electronic ink display, on the opposite side of the device. As discussed herein, the terms primary and secondary are used merely to distinguish between different screens on a multi-screen mobile device. In one embodiment, the mobile device with a primary and a secondary display may be a computing device as described in copending U.S. patent application Ser. No. 14/406,446, entitled "Secondary Display Mechanism," filed on Jan. 29, 2014.

When the mobile device includes a secondary display, the usage contexts based on the orientation of the mobile device relative to the user enable the mobile device to configure one or more of the screens. For example, based on a determined usage context or change in usage context, the mobile device can configure one or more of the display screens by: disabling the touch input of the primary display if the user is determined to be holding and reading the secondary display to avoid unwanted touch events on primary display, enabling a secondary display to display social broadcasting messages (e.g., images, status, etc. for other users to see) when a user is determined to be facing a primary display, switching the social broadcasting on secondary display to a utility window that displays data feeds, email alerts, text messages, etc. when the user turns the tablet to face the secondary display, sending the data being displayed on the primary screen to the secondary screen when the user turns the tablet from the primary to the secondary display, as well as other configurations.

The mobile device configuration operations should not be interpreted to be limited to configuration of the content of one or more of the displays, and can include, for example, performing power management functions, such as placing a screen into standby mode when the screen is not determined to be in use, pre-starting a screen when a usage context begins to shift towards usage of a previously unused screen, exiting a sleep mode when a user picks up a screen and is determined to be close to either a primary or secondary display, entering sleep mode when a user puts down the mobile device and is not proximate to either a primary or secondary display, adjusting the brightness of a non-used screen, performing thermal management, as well as other configuration operations. As a result, the automatic configuration can be used to realize significant power savings by handling the non-use of one or more display screens. Furthermore, the automatic configuration can be used to prevent unintended consequences when a user inadvertently interacts with the mobile device.

In one embodiment, the configuration of one or more hardware components of the mobile device may be further based on an application launched by a user. That is, the usage context may be based on both an orientation of the mobile device relative to a user and an application initiated by a user. For example, when a user selects a document in an electronic document reader application on a primary display, the mobile device can display the selected document on the secondary (e-ink) display and deactivate touch and/or a current display on the primary display. Furthermore, launch of an application combined with an evolving or changing orientation relative to the user may be utilized to refine or change between different usage contexts. For example, the deactivation of a primary display and activation of a secondary display to display data from a launched application can be initiated in response to detection the application's launch and a rotation or other movement away from the primary display, and towards the secondary display.

FIG. 1 is a flow diagram of one embodiment of a method 100 for configuring a mobile device for a usage context that is based on an orientation of the mobile device relative to a user. The method 100 is performed by processing logic of a mobile device, such as a tablet computer, smartphone, laptop computer, etc., that may comprise hardware (circuitry, dedicated logic, etc.), software (such as is run on a general purpose computer system or a dedicated machine), firmware, or a combination.

Referring to FIG. 1, processing logic begins by collecting sensor data from a plurality of sensors coupled with a mobile device (processing block 102). In one embodiment, as discussed herein, the mobile device can be a tablet computer with at least one touchscreen display, a processor, a memory, a plurality of sensors, as well as other components typically included with mobile computer systems. In one embodiment, the plurality of sensors include at least one accelerometer for collecting data indicative of an orientation of the mobile device in three-dimensional space, and at least one proximity sensor that detects user proximity to the touchscreen display. The plurality of sensors may include additional sensors, such as, a gyroscope sensor for detecting rotation of the mobile device, a magnetometer for determining bearing direction of the mobile device, as well as other sensors.

In one embodiment, the mobile device can include a secondary display, which is disposed on an opposite side of the mobile device. In one embodiment, the secondary display may also be a touchscreen display capable of receiving touch interactions of a user. In another embodiment, the secondary display is a different type of display, such as an electronic ink display. In either embodiment, the secondary display may have its own proximity sensor to detect user proximity to the secondary touchscreen display.

Processing logic establishes an orientation of the mobile device relative to a user of the mobile device (processing block 104). In one embodiment, processing logic utilizes the sensor data collected at processing block 104 to determine the orientation of the mobile device relative to the user. In one embodiment, the sensor data includes at least accelerometer data for determining an orientation of the mobile device and proximity data for determining a user's proximity to one or more displays of the mobile device. In one embodiment, the combination of the orientation of the mobile device and the proximity data enable processing logic to establish the mobile device's orientation relative to a user. For example, if a user were holding a mobile device with two screens on opposite sides of the mobile device, the absolute orientation as determined from accelerometer data might indicate that the device's orientation is vertical to the ground. From this alone, it is not possible to tell which screen the user is looking at, as either screen may be facing the user when the device has a vertical orientation. The situation becomes even more complicated when the device's absolute orientation is horizontal to the ground, as this may indicate non-use of the device, the user may be using the mobile device on his lap, the user may be using the mobile device while it rests on a table, etc. Thus, the proximity sensor data enables the orientation to be established relative to a user for any absolute orientation of the device. That is, the proximity data enables processing logic to refine the orientation to determine if the user is using a screen at a particular orientation. For example, the proximity sensor data enables processing logic to determine whether the user is looking at a primary display while laying down (e.g., a horizontal orientation with a user proximity to a display screen), or whether the mobile device is in a state of non-use because there is no user proximity to either display screen.

Processing logic may also determine one or more active applications executing on the mobile device (processing block 106). The active applications may include applications previously running on the mobile device, as well as applications that have been launched in response to a user command. In one embodiment, the applications enable processing logic to further refine the intended usage of a user. For example, for the mobile device with two display screens, where a primary display is a touch sensitive display and a secondary display is an electronic ink display, the launching of an e-reader application can indicate that the intended usage of the mobile device by the user is to use the secondary display and deactivate the primary display.

Processing logic then determines a usage context for the mobile device based at least on the established orientation of the mobile device relative to the user (processing block 108). In one embodiment, the usage context enables processing logic to infer an intended likely usage of the mobile device by the user. Continuing an example above, where orientation data and proximity data indicate that a mobile device's touchscreen is being used (e.g., when a user is holding the mobile device while laying on their back), even though the absolute orientation may indicate that the touchscreen is facing down, the usage context may indicate that the primary display is in use. In one embodiment, the application data determined at processing block 106 may also be used to determine a usage context for the user. For example, when an e-reader application is launched by a user, and the user is facing the primary display, a secondary e-ink display is not activated. However, when the sensor data indicates either rotation away from the primary display, proximity to the secondary display, etc., the usage context shifts to usage of the secondary display and non-usage of the primary display.

Processing logic configures one or more components of the mobile device based on the determined usage context (processing block 110). In embodiments, processing logic can apply one or more configurations of the mobile device based on the determined usage context. The one or more configurations may include any combination of enabling or disabling touch capabilities on one or more display screens, turning on or off a display screen, placing display screens in reduced power states (e.g., connected standby, sleep, adjusting brightness, etc.), placing other components in reduced power states, determining what data to display on a non-used screen (e.g., application data on a screen being viewed by a user, and displaying social data on a non-used screen), as well as other configuration options. For example, when sensor data and application data indicate that the user is moving from the primary display to secondary display on a mobile device, processing logic can automatically configure the mobile device by disabling the touch sensitive capabilities of a primary display and powering up the secondary display with relevant application and/or display data. As a result, even when the user holds the device and looks at the secondary display, they do not inadvertently touch or otherwise interact with the primary display. As another example, when the mobile device is in a standby or sleep state, sensor data may indicate that a user has moved into a certain proximity level to a display screen. This may indicate a change in the usage context from non-usage to usage of the display screen. Processing logic can respond to the usage context change by exiting the sleep state automatically and prior to a user request.

Figure 2:
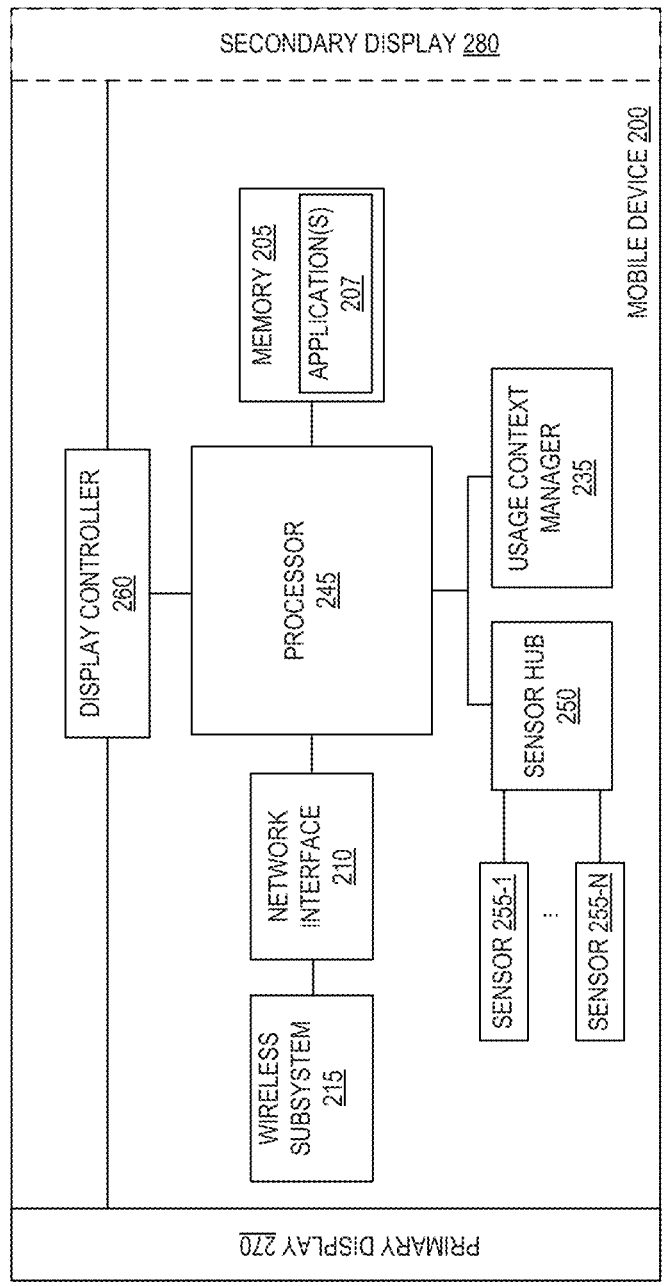
FIG. 2 is block diagram of one embodiment of a mobile device.

FIG. 2 is block diagram of one embodiment of a mobile device 200. In one embodiment, mobile device 200 is a system, such as a tablet computer, mobile telephone, or laptop computer, which may include one or more processors 245, a memory 205, primary display 270 (which may be integrated with touchscreen), a plurality of sensors (e.g., sensors 255-1 through 255-N), and network interface 210. In one embodiment, mobile device 200 may also include an optional secondary display 280, which may also be integrated with a touch screen, or may be a different type of display, such as an electronic ink display (with or without touch). Mobile device 200 may also include a number of processing modules, which may be implemented as hardware, software, firmware, or a combination, such as display controller 260, sensor hub 250, and usage context manager 235. It should be appreciated that mobile device 200 may also include, although not illustrated, a power device (e.g., a battery), an audio input and audio output (e.g., a microphone and speaker), as well as other components typically associated with electronic devices. Network interface 210 may also be coupled to a number of wireless subsystems 215 (e.g., Bluetooth, WiFi, Cellular, or other networks) to transmit and receive data streams through a wireless link. In one embodiment, wireless subsystem 215 communicatively couples mobile device 200 to one or more computer and/or cellular networks.

In one embodiment, memory 205 may be coupled to processor 245 to store instructions for execution by the processor 245. In some embodiments, memory 205 is non-transitory. Memory 205 may store usage context manager 235 to implement embodiments described herein. However, in another embodiment, usage context manager 235 may also be implemented by hardware or firmware of display controller 260 or sensor hub 250. In yet another embodiment, usage context manager 235 may also be implemented in part by one or more of display controller 260, sensor hub 250, and processor 245. It should be appreciated that embodiments of the invention as will be hereinafter described may be implemented through the execution of instructions, for example as stored in memory or other element, by processor 245 of mobile device 200, and/or other circuitry of mobile device 200. Particularly, circuitry of mobile device 200, including but not limited to processor 245, may operate under the control of a program, routine, or the execution of instructions to execute methods or processes in accordance with embodiments of the invention. For example, such a program may be implemented in firmware or software (e.g. stored in memory 205) and may be implemented by processors, such as processor 245, and/or other circuitry. Further, it should be appreciated that the terms processor, microprocessor, circuitry, controller, etc., may refer to any type of logic or circuitry capable of executing logic, commands, instructions, software, firmware, functionality and the like.

Sensor hub 250 is responsible for collecting data gathered by sensors 255-1 through 255-N. In one embodiment, the sensor hub 250 is a microprocessor, digital signal processor, etc. that is dedicated to receiving, combining, and analyzing the sensor data gathered by sensors. In another embodiment, sensor hub 250 may be integrated into processor 245 as hardware, firmware, or a combination. In one embodiment, the sensors 255 are different sensors, such as one or more accelerometers, gyros, magnetometers, proximity sensors, etc. Thus, sensor hub 250 is capable of handling sensor data from the various different sensor types.

Usage context manager 235 receives sensor data from the sensor hub 250. As discussed herein, the sensor data may include at least accelerometer data indicative of an orientation of the mobile device, proximity sensor data indicative of user proximity to either the primary display 270 or the secondary display 280, as well as other sensor data. In one embodiment, usage context manager 235 utilizes the sensor data to establish an orientation of mobile device 200 relative to a user.

Usage context manager 235 may also receive application data indicative of one or more applications 207 that are currently running, or have been recently launched by a user of the mobile device. For example, when a user launches an e-reader application, the application can send usage context manager 235 information associate with the launch of the application. However, usage context manager 235 may also monitor applications executed by processor 245 to detect what applications are running, when an application is launched, when an application is closed, etc.

Usage context manager 235 utilizes the determined orientation relative to the user and the optional application data, to establish a usage context of the mobile device 200. The determined usage context reflects an intended likely usage of mobile device 200 by a user. For example, a usage context determination for "system being held in hands" is possible via a sensor data classifier that analyzes patterns of motion sensor data. Even in a fully stable state, mobile device 200 in the hands of a user shows different patterns than mobile device 200 on a table. In one embodiment, different sensor data classifiers for differentiating between usage contexts may be trained using a machine learning model. Such classifiers can use the input feature set from the sensors 255 (e.g., accelerometer data and proximity data) and features derived from this. The derived features can include an integration of x, y and z values of an accelerometer, rate of change of x, y and z values, co-variance data, etc. Based on the resulting sensor data classifier based analysis, the usage context can be established as, for example "system being held in hands," "system in lap," "user in front of primary display," "user in front of secondary display," as well as other usage contexts. The usage contexts discussed herein are exemplary only, and should not be interpreted as the only usage contexts determined by usage context manager 235.

In one embodiment, based on the determined usage context, usage context manager 235 applies one or more different configurations to one or more of the displays 270 or 280 of mobile device 200. For example, if a user is facing secondary display 280 or mobile device is rotating towards secondary display 280, usage context manager 235 can command display controller to disable touch sensing capabilities of primary display 270 and initiate/power-up secondary display 280. Other actions could also be taken, such as selecting application data from one of applications 207 to display on the non-active primary display 270. For example, social networking data, status, etc. can be displayed on primary display 270 or secondary display 280, while the other display is in use.

In one embodiment, usage context manager 235 may also utilize the usage context to apply one or more power management configurations to mobile device 200. For example, one or more hardware components that are determined to not be used by a current usage context may be placed in a reduced power state, shut down, etc. Furthermore, thermal controls may also be applied by user context manager 235 based on the non-usage or reduced usage of various mobile device 200 components indicated in a specific usage context. As a result, power savings, which is a critical matter for mobile devices, can be achieved.

Figure 3:
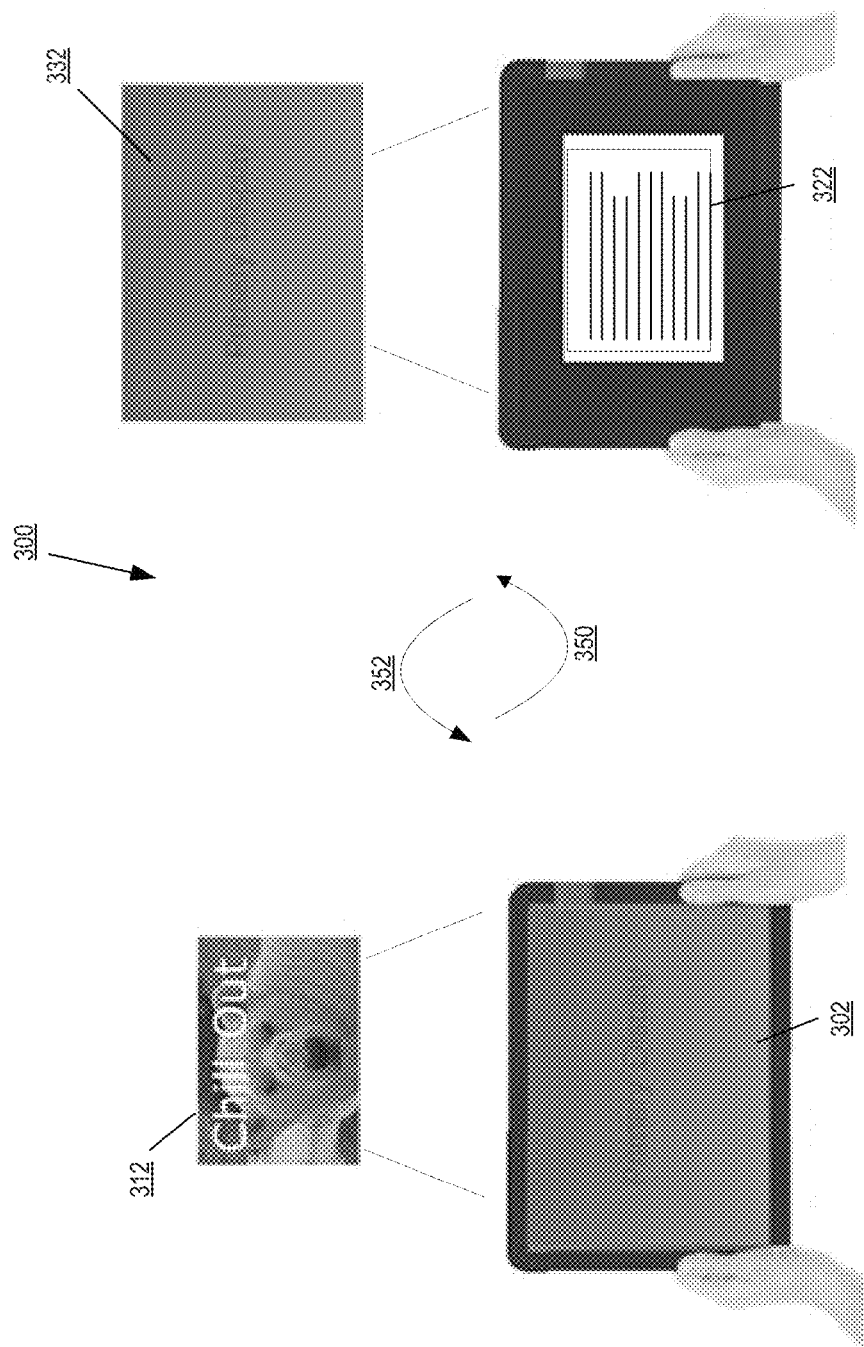
FIG. 3 is an illustration of configuring the mobile device for a usage context that is based on an orientation of the mobile device relative to a user.

FIG. 3 is an illustration of configuring the mobile device for a usage context that is based on an orientation of the mobile device relative to a user. In the illustration, a user is holding the mobile device and looking at a primary display 302. Sensor data, which can include data indicative or an orientation of the mobile device and a proximity of the user to the primary display 302, enable the establishment of a current usage context. In one embodiment, the usage context can be associated with the display of social networking data 312 on a secondary display of the mobile device.

When a change in usage context is detected 350, such as rotation of the mobile device away from the primary display 302 and towards the secondary display 322, launching of an application that will utilize the secondary display 322, or other usage context changes, a different configuration of components of the mobile device is applied. In one embodiment, the new/updated configuration can include displaying data on the secondary display 322 associated with the launched application, disabling touch on the primary display 332, displaying data on the primary display 332 when not in use, etc. Another change in context can be detected 352, which returns the mobile device back to a prior usage context or to a new usage context, for which the mobile device is appropriately configured.

Figure 4:
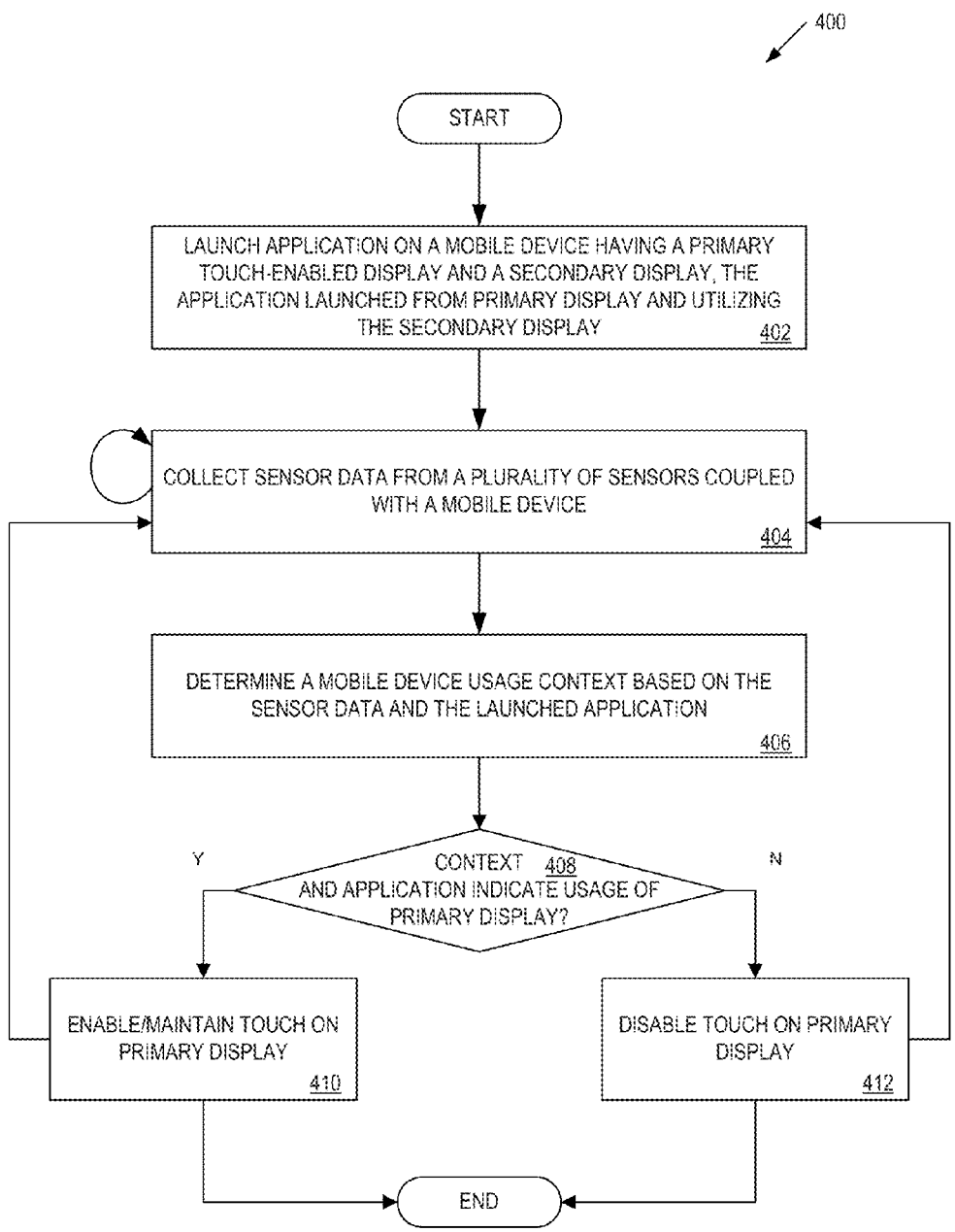
FIG. 4 is a flow diagram of one embodiment of a method for automatically configuring a primary display screen of a mobile device for a usage context that is based on an orientation of the primary display screen relative to a user.

FIG. 4 is a flow diagram of one embodiment of a method 400 for automatically configuring a primary display screen of a mobile device for a usage context that is based on an orientation of the primary display screen relative to a user. The method 400 is performed by processing logic of a mobile device, such as a tablet computer, smartphone, laptop computer, etc., that may comprise hardware (circuitry, dedicated logic, etc.), software (such as is run on a general purpose computer system or a dedicated machine), firmware, or a combination. In one embodiment, the processing is performed by mobile device 200 of FIG. 2.

Referring to FIG. 4, processing logic begins by launching an application on a device having a primary touch-enabled display and a secondary display, where the application is launched from the primary display and utilizes the secondary display (processing block 402). In one embodiment, the application may be an e-reader application that will be used to display text or other content from the e-reader application. Other applications types and display data may be utilized in accordance with the description herein.

Processing logic collects sensor data from a plurality of sensors coupled with a device (processing block 404) and determines a usage context, which is an orientation of the mobile device relative to a user, based on the sensor data and the launched application (processing block 406). In one embodiment, the sensor data collection and usage context determination are performed as discussed above in FIGS. 1 and 2.

When the usage context and application data indicate usage of the primary display (processing block 408), the primary display touch sensing capabilities are maintained and/or enabled to reflect the user's usage of the primary display (processing block 410). For example, a user may launch an application that will utilize the secondary display of a mobile device, but the user continues to browse, make selections, etc. on the primary display. In this example, the primary display and touch sensing capabilities of the primary display would continue to operate under the mobile device's original configuration, and processing logic would return to processing block 404 to collect additional sensor data to determine when another change in usage context occurs.

When the usage context and application indicate a lack of usage of the primary display (processing block 408), processing logic disables touch on the primary display (processing block 412). In one embodiment, the disabling of touch on the primary display ensures that the user does not inadvertently touch, select, launch applications, etc. on the primary display while they are viewing the secondary display.

Processing logic then returns to processing block 404 to collect additional sensor data to determine when another change in usage context occurs.

Furthermore, additional mobile device configurations, such as sending data to the secondary display for display to a user, powering down the primary display, performing one or more thermal management tasks, performing one or more power management tasks, etc. can be applied by processing logic based on the determined usage context, or change in usage context, in accordance with the discussion herein.

Figure 5:
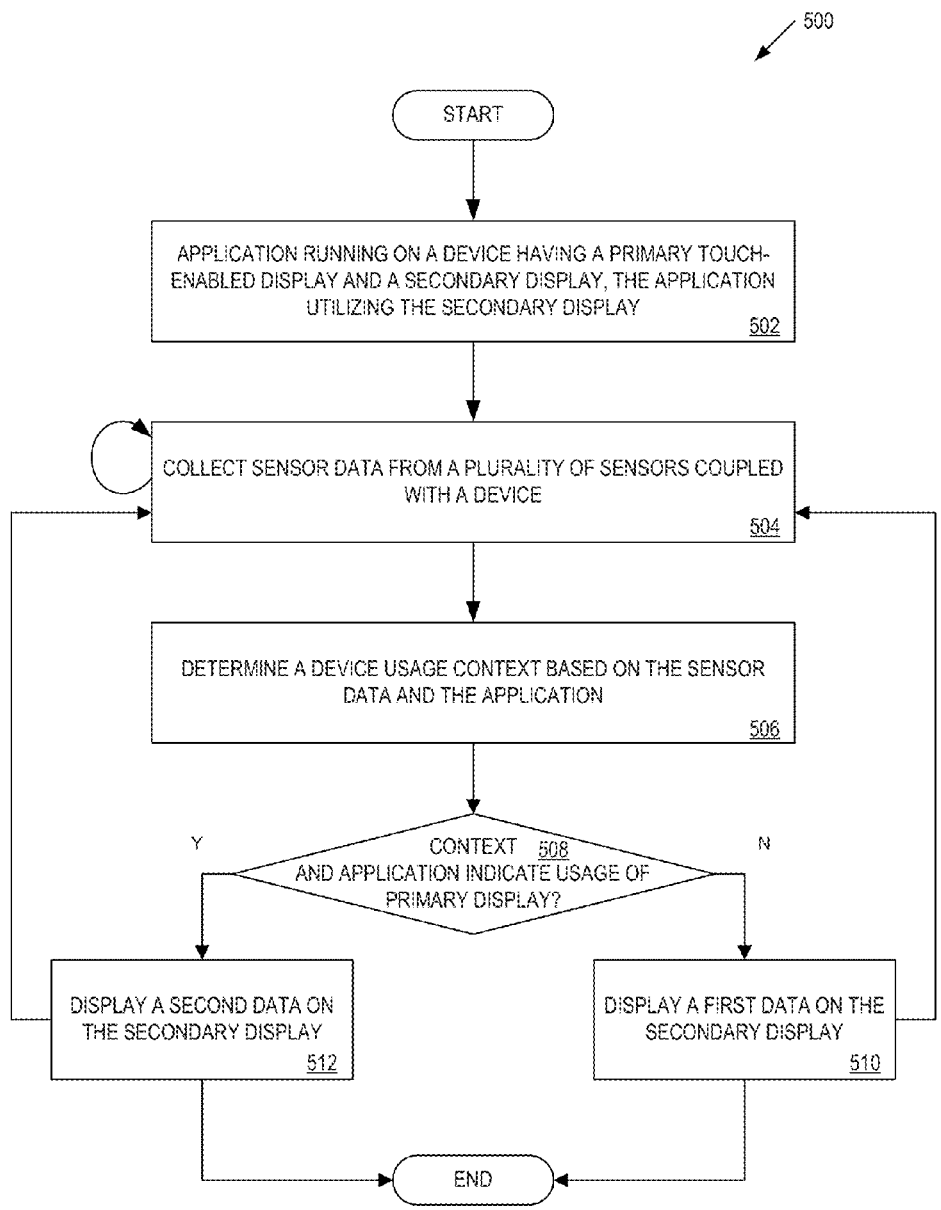
FIG. 5 is a flow diagram of one embodiment of a method for automatically configuring content on a secondary display screen on a mobile device for a usage context that is based on an orientation of the primary display screen relative to a user.

FIG. 5 is a flow diagram of one embodiment of a method for automatically configuring content on a secondary display screen on a mobile device for a usage context that is based on an orientation of the primary display screen relative to a user. The method 500 is performed by processing logic of a mobile device, such as a tablet computer, smartphone, laptop computer, etc., that may comprise hardware (circuitry, dedicated logic, etc.), software (such as is run on a general purpose computer system or a dedicated machine), firmware, or a combination. In one embodiment, the processing is performed by mobile device 200 of FIG. 2.

Referring to FIG. 5, processing logic begins with an application running on a mobile device having a primary touch-enabled display and secondary display (with or without touch), where the application utilizes the secondary display (processing block 502). The application may be a social networking application, utility application, or other application type which can utilize the secondary display.

Processing logic collects sensor data from a plurality of sensors coupled with a device (processing block 504) and determines a usage context, which is an orientation of the mobile device relative to a user, based on the sensor data and the launched application (processing block 506). In one embodiment, the sensor data collection and usage context determination is performed as discussed above in FIGS. 1 and 2.

When the usage context and application indicate usage of the primary display (processing block 508), processing logic displays a first data on the secondary display (processing block 510). In one embodiment, processing logic displays social network, user personalization data (i.e., images or text), user status, etc. on the secondary display. That is, by determining usage of the primary display, processing logic can infer that the secondary screen is facing away from the user, and potentially at additional users. Thus, processing logic utilizes this usage context to display additional data, to those other users. In one embodiment, the additional data that is displayed on the secondary display may be pre-selected by the user.

However, when the usage context and application indicate a lack usage of the primary display (processing block 508), processing logic displays a second data on the secondary display (processing block 512). In one embodiment, the secondary data can be application data from one or more of the running applications. In another embodiment, the second data can be utility data, such as text messages, email message alerts, telephone call alerts, or other data that may alert the user of a potential usage of the primary display.

Processing logic then returns to processing block 504 to collect additional sensor data to determine when a change in usage context occurs.

Figure 6:
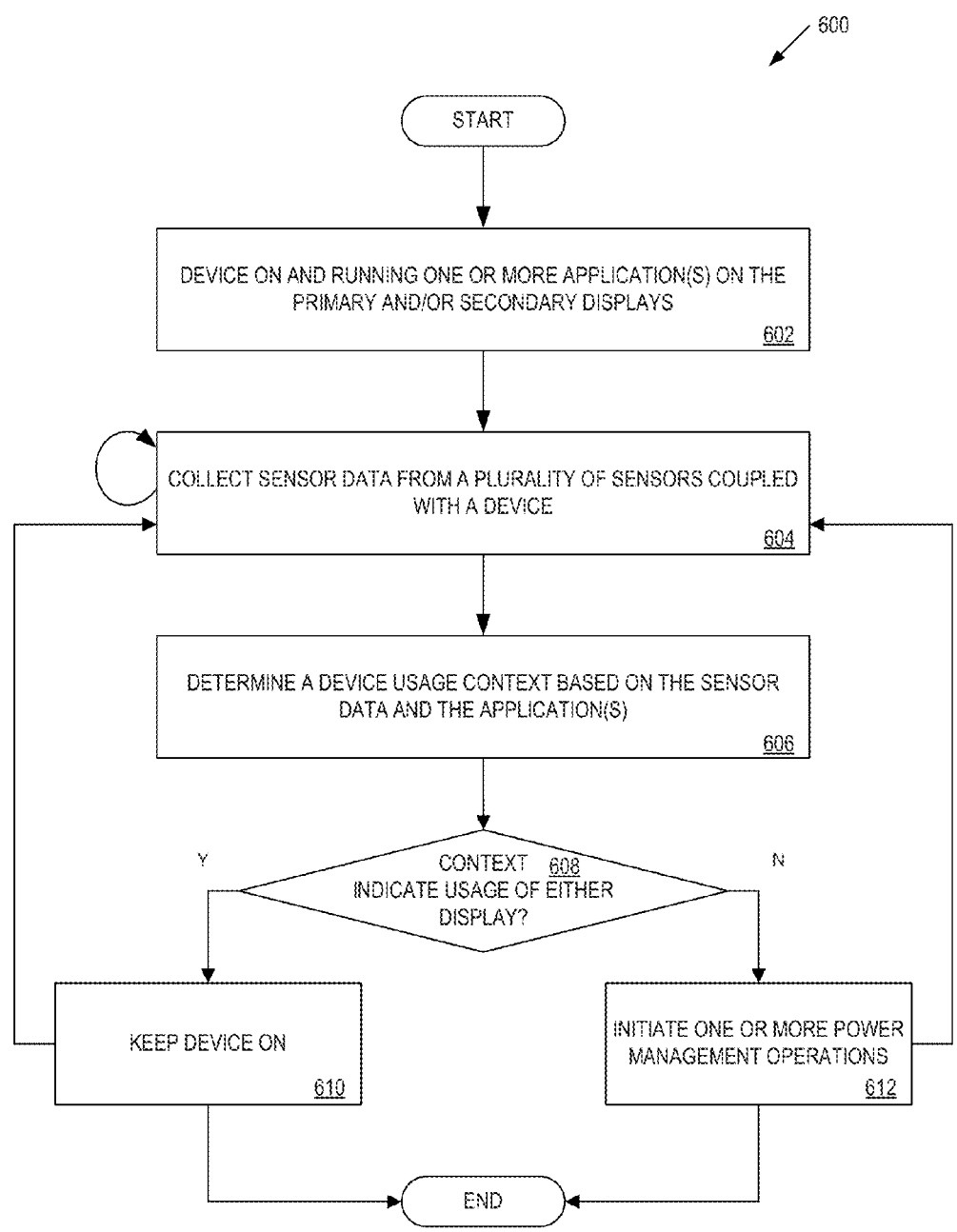
FIG. 6 is a flow diagram of one embodiment of a method for automatically performing power management on a mobile device for a usage context that is based on a usage context of the mobile device.

FIG. 6 is a flow diagram of one embodiment of a method for automatically performing power management on a mobile device for a usage context that is based on a usage context of the mobile device. The method 600 is performed by processing logic of a mobile device, such as a tablet computer, smartphone, laptop computer, etc., that may comprise hardware (circuitry, dedicated logic, etc.), software (such as is run on a general purpose computer system or a dedicated machine), firmware, or a combination. In one embodiment, the processing is performed by mobile device 200 of FIG. 2.

Referring to FIG. 6, processing logic begins when the mobile device is on and one or more applications are running on the primary and/or secondary displays of the mobile device (processing block 602). Processing logic collects sensor data from a plurality of sensors coupled with a device (processing block 604) and determines a usage context, which is an orientation of the mobile device relative to a user, based on the sensor data and the launched application (processing block 606). In one embodiment, the sensor data collection and usage context determination is performed as discussed above in FIGS. 1 and 2.

When the usage context indicates usage of either display (processing block 608), processing logic keeps the device in an active state (processing block 610). However, when the usage context indicates non-usage of both displays (processing block 608), processing logic initiates one or more power management operations (processing block 612). In one embodiment, the power management operations can include one or more of turning off the device displays, placing one or more components of the mobile device in a standby state, placing the mobile device in a sleep state, as well as other power management actions taken to reduce power consumption by the mobile device. Along with device state changes, thermal management functions may also be implemented in order to reduce power consumption by the mobile device. As a result of the usage context based power management, additional power savings can be realized over conventional timer-based and user initiated power state changes.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), or any other suitable device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the embodiments disclosed herein may be embodied directly in hardware, in a software module executed by a processor, or in a combination of the two. A software module may reside in random-access memory (RAM), flash memory, read-only memory (ROM), erasable programmable read-only memory (EPROM), electronically erasable programmable read-only memory (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The following examples pertain to further embodiments.

Example 1 is a system for automatically configuring a mobile device. The system can comprise a plurality of sensors to collect sensor data associated with the mobile device, a touch sensitive display, and a processor coupled with the plurality of sensors and the touch sensitive display. The process can be configured to establish an orientation of the mobile device relative to a user of the mobile device based on the sensor data, determine a usage context for the mobile device based at least on the established orientation of the mobile device relative to the user, and configure one or more components of the mobile device based on the determined usage context.

In Example 2, the subject matter of Example 1 can optionally include that the orientation of the mobile device relative to the user is based on at least sensor data indicative of a physical orientation of the device and sensor data indicative of user proximity to the touch sensitive display.

In Example 3, the subject matter of Examples 1-2 can optionally include the processor is further configured to determine one or more applications being executed by the processor on the mobile device, and determine the usage context for the mobile device based on the established orientation of the mobile device relative to the user and the one or more applications being executed.

In Example 4, the subject matter of Examples 1-3 can optionally include a second display disposed on the mobile device opposite the touch sensitive display, wherein touch sensitive display is a primary display and the processor is further configured to apply different configurations to the touch sensitive display and the second display based on the established usage context.

In Example 5, the subject matter of Example 4 can optionally include that the determined usage context for the mobile device comprises an intended usage of the second display, and wherein the processor is configured to disable touch sensing on the primary display.

In Example 6, the subject matter of Example 5 can optionally include that the processor is configured to turn off the primary display.

In Example 7, the subject matter of Examples 4-6 can optionally include that the second display is a touch sensitive display.

In Example 8, the subject matter of Examples 4-6 can optionally include that the second display is a display type different from the touch sensitive display.

In Example 9, the subject matter of Examples 1-3 can optionally include that the determined usage context for the mobile device comprises an intended usage of the second display based at least in part on an application running on the mobile device. The subject matter can optionally include that the processor is configured to display a first data on the second display when the determined usage context indicates the user is viewing the touch sensitive display, and display a second data on the second display when the determined usage context indicates the user is viewing the second display.

In Example 10, the subject matter of Example 9 can optionally include that the first data comprises one or more of social networking data and user selected personalization data, and the second data comprise data generated by the application.

In Example 11, the subject matter of Examples 1-3 can optionally include that the usage context is a likely intended usage of the mobile device by the user inferred from the established orientation of the mobile device relative to the user.

In Example 12, the subject matter of Examples 1-3 can optionally include that the plurality of sensors comprise two or more of an accelerometer, a proximity sensor, a gyroscopic sensor, and a magnetometer.

In Example 13, the subject matter of Examples 1-3 can optionally include that the processor is to configure the one or more components of the mobile device based on the determined usage context further comprises the processor to place at least one of the one or more components of the mobile device into a reduced power state.

In Example 14, the subject matter of Examples 1-3 can optionally include that the processor is to configure the one or more components of the mobile device based on the determined usage context further comprises the processor to apply a thermal management setting to at least one of the one or more components of the mobile device.

In Example 15, the subject matter of Examples 1-3 can optionally include that the mobile device is a tablet computer.

In Example 16, the subject matter of Examples 1-3 can optionally include that the mobile device is a smartphone.

All optional features of the system described above may also be implemented with respect to the methods or processes described herein. Furthermore, specifics in the examples above may be used anywhere in one or more embodiments. For example, a method for automatically configuring a mobile device can be performed that optionally includes any of Examples 1 to 16 above. As another example, at least one non-transitory machine readable medium comprising a plurality of instructions that in response to being executed on a computing device, cause the computing device to optionally carry out the method in any of the Examples 1 to 16 above.

What is claimed is:

1. A system for automatically configuring a mobile device, comprising:
   a plurality of sensors to collect sensor data associated with the mobile device;
   a touch sensitive display;
   a second display disposed on the mobile device opposite the touch sensitive display, wherein the touch sensitive display is a primary display; and
   a processor coupled with the plurality of sensors, the touch sensitive display, and the second display to
      establish an orientation of the mobile device relative to a user of the mobile device based on the sensor data,
      determine a usage context for the mobile device based at least on the established orientation of the mobile device relative to the user,
      configure one or more components of the mobile device based on the determined usage context, and
      apply different configurations to the primary display and the second display based on the established usage context, wherein the determined usage context for the mobile device comprises an intended usage of the second display, and wherein the processor is configured to disable touch sensing on the primary display.

2. The system of claim 1, wherein the orientation of the mobile device relative to the user is based on at least sensor data indicative of a physical orientation of the device and sensor data indicative of user proximity to the touch sensitive display.

3. The system of claim 1, wherein the processor is further configured to:
   determine one or more applications being executed by the processor on the mobile device, and
   determine the usage context for the mobile device based on the established orientation of the mobile device relative to the user and the one or more applications being executed.

4. The system of claim 1, wherein the processor is configured to turn off the primary display.

5. The system of claim 1, wherein the second display is a touch sensitive display.

6. The system of claim 1, wherein the second display is a display type different from the touch sensitive display.

7. The system of claim 1, wherein the usage context is a likely intended usage of the mobile device by the user inferred from the established orientation of the mobile device relative to the user.

8. The system of claim 1, wherein the plurality of sensors comprise two or more of an accelerometer, a proximity sensor, a gyroscopic sensor, and a magnetometer.

9. The system of claim 1, wherein the processor to configure the one or more components of the mobile device based on the determined usage context further comprises the processor to place at least one of the one or more components of the mobile device into a reduced power state.

10. The system of claim 1, wherein the processor to configure one or more components of the mobile device based on the determined usage context further comprises the processor to apply a thermal management setting to at least one of the one or more components of the mobile device.

11. The system of claim 1, wherein the mobile device is a tablet computer.

12. The system of claim 1, wherein the mobile device is a smartphone.

13. A system for automatically configuring a mobile device, comprising:
   a plurality of sensors to collect sensor data associated with the mobile device;
   a touch sensitive display;
   a second display disposed on the mobile device opposite the touch sensitive display, wherein the touch sensitive display is a primary display; and
   a processor coupled with the plurality of sensors, the touch sensitive display, and the second display to
      establish an orientation of the mobile device relative to a user of the mobile device based on the sensor data,
      determine a usage context for the mobile device based at least on the established orientation of the mobile device relative to the user, configure one or more components of the mobile device based on the determined usage context, and
apply different configurations to the primary display and the second display based on the established usage context, wherein the determined usage context for the mobile device comprises an intended usage of the second display based at least in part on an application running on the mobile device, and wherein the processor is configured to
display a first data on the second display when the determined usage context indicates the user is viewing the touch sensitive display, and
display a second data on the second display when the determined usage context indicates the user is viewing the second display.

14. The system of claim 13, wherein the first data comprises one or more of social networking data and user selected personalization data, and the second data comprise data generated by the application.

15. A method for automatically configuring a mobile device having a primary touch sensitive display and a second display disposed on the mobile device opposite the primary touch sensitive display, comprising:
collecting sensor data associated with the mobile device from a plurality of sensors;
establishing an orientation of the mobile device relative to a user of the mobile device based on the sensor data;
determining a usage context for the mobile device based at least on the established orientation of the mobile device relative to the user;
configuring one or more components of the mobile device based on the determined usage context; and
applying different configurations to the primary touch sensitive display and the second display based on the established usage context, wherein the determined usage context for the mobile device comprises an intended usage of the second display, and wherein a configuration applied to the primary touch sensitive display comprises disabling touch sensing on the primary touch sensitive display.

16. The method of claim 15, wherein the orientation of the mobile device relative to the user is based on at least sensor data indicative of a physical orientation of the device and sensor data indicative of user proximity to a touch sensitive display of the mobile device.

17. The method of claim 15, further comprising:
determining one or more applications being executed by the processor on the mobile device, and
determining the usage context for the mobile device based on the established orientation of the mobile device relative to the user and the one or more applications being executed.

18. The method of claim 15, wherein the mobile device comprises a primary touch sensitive display and a second display disposed on the mobile device opposite the primary touch sensitive display, the method further comprising:
applying different configurations to the primary touch sensitive display and the second display based on the established usage context.

19. The method of claim 15, wherein configuring the one or more components of the mobile device further comprises placing at least one of the one or more components of the mobile device into a reduced power state.

20. A method for automatically configuring a mobile device having a primary touch sensitive display and a second display disposed on the mobile device opposite the primary touch sensitive display, comprising:
collecting sensor data associated with the mobile device from a plurality of sensors;
establishing an orientation of the mobile device relative to a user of the mobile device based on the sensor data;
determining a usage context for the mobile device based at least on the established orientation of the mobile device relative to the user;
configuring one or more components of the mobile device based on the determined usage context;
applying different configurations to the primary touch sensitive display and the second display based on the established usage context, wherein the determined usage context for the mobile device comprises an intended usage of the second display based at least in part on an application running on the mobile device, further comprising:
displaying a first data on the second display when the determined usage context indicates the user is viewing the primary touch sensitive display, and
displaying a second data on the second display when the determined usage context indicates the user is viewing the second display.

21. At least one non-transitory machine readable medium comprising a plurality of instructions that in response to being executed on a computing device, cause the computing device to carry out a method for automatically configuring a mobile device having a primary touch sensitive display and a second display disposed on the mobile device opposite the primary touch sensitive display, comprising:
collecting sensor data associated with the mobile device from a plurality of sensors;
establishing an orientation of the mobile device relative to a user of the mobile device based on the sensor data;
determining a usage context for the mobile device based at least on the established orientation of the mobile device relative to the user;
configuring one or more components of the mobile device based on the determined usage context; and
applying different configurations to the primary touch sensitive display and the second display based on the established usage context, wherein the determined usage context for the mobile device comprises an intended usage of the second display, and wherein a configuration applied to the primary touch sensitive display comprises disabling touch sensing on the primary touch sensitive display.

22. The non-transitory machine readable medium of claim 21, wherein the orientation of the mobile device relative to the user is based on at least sensor data indicative of a physical orientation of the device and sensor data indicative of user proximity to a touch sensitive display of the mobile device.

23. The non-transitory machine readable medium of claim 21, further comprising:
determining one or more applications being executed by the processor on the mobile device, and
determining the usage context for the mobile device based on the established orientation of the mobile device relative to the user and the one or more applications being executed.

* * * * *